United States Patent
Caliskan et al.

(10) Patent No.: US 10,967,720 B2
(45) Date of Patent: Apr. 6, 2021

(54) BODY-ON-FRAME ELECTRIC VEHICLE WITH BATTERY PACK INTEGRAL TO FRAME

(71) Applicant: Ford Global Technologies, LLC, Dearborn, MI (US)

(72) Inventors: Ari Caliskan, Canton, MI (US); Arnold Kadiu, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 332 days.

(21) Appl. No.: 15/980,910

(22) Filed: May 16, 2018

(65) Prior Publication Data

US 2019/0351750 A1    Nov. 21, 2019

(51) Int. Cl.
| | | |
|---|---|---|
| *B60R 16/04* | (2006.01) | |
| *B60K 1/02* | (2006.01) | |
| *B60K 1/04* | (2019.01) | |
| *B62D 65/10* | (2006.01) | |
| *B62D 21/11* | (2006.01) | |
| *B62D 21/02* | (2006.01) | |
| *B62D 29/00* | (2006.01) | |

(52) U.S. Cl.
CPC ............... *B60K 1/02* (2013.01); *B60K 1/04* (2013.01); *B62D 21/02* (2013.01); *B62D 21/11* (2013.01); *B62D 65/10* (2013.01); *B60K 2001/0438* (2013.01); *B62D 29/007* (2013.01); *B62D 29/008* (2013.01)

(58) Field of Classification Search
CPC ... B60K 1/00; B60K 1/02; B60K 1/04; B60K 2001/001; B60K 2001/0438; B60K 2001/0405; B60K 17/354; B60K 17/356; B62D 65/10; B62D 21/00; B62D 21/11; B62D 21/02; B62D 21/07; B62D 21/10
See application file for complete search history.

(56) References Cited

U.S. PATENT DOCUMENTS

| | | | | |
|---|---|---|---|---|
| 4,365,681 A | * | 12/1982 | Singh ................. | H01M 2/1083 180/68.5 |
| 5,501,289 A | * | 3/1996 | Nishikawa ............. | B62D 21/10 180/68.5 |
| 7,614,473 B2 | * | 11/2009 | Ono ....................... | B60L 58/21 180/299 |
| 7,824,797 B2 | * | 11/2010 | Nishino .............. | B60L 11/1877 429/163 |

(Continued)

FOREIGN PATENT DOCUMENTS

| | | |
|---|---|---|
| CN | 202728339 | 2/2013 |
| CN | 106476891 | 3/2017 |
| JP | 2006044400 | 2/2006 |

*Primary Examiner* — James M Dolak
(74) *Attorney, Agent, or Firm* — Burris Law, PLLC (57) ABSTRACT

A body-on-frame vehicle includes a left frame rail, a right frame rail, a plate, a plurality of cross-members, a plurality of power storage modules, and a first electric motor. The plate is attached to both frame rails. The plurality of cross-members are attached to both frame rails. Adjacent cross-members cooperate with the plate and frame rails to define compartments. The plurality of power storage modules are disposed within a plurality of the compartments. The first electric motor is supported by a section of the frame rails forward or rearward of the power storage modules.

20 Claims, 5 Drawing Sheets

(56) References Cited

U.S. PATENT DOCUMENTS

| | | | |
|---|---|---|---|
| 8,739,907 B2* | 6/2014 | Store | B60L 50/66 |
| | | | 180/68.5 |
| 8,776,920 B2* | 7/2014 | Suzuki | B60L 50/16 |
| | | | 180/65.21 |
| 8,820,452 B2 | 9/2014 | Iwasa et al. | |
| 8,833,839 B2* | 9/2014 | Young | B62D 21/157 |
| | | | 296/187.12 |
| 9,614,207 B2* | 4/2017 | Wu | H01M 10/63 |
| 9,649,923 B2* | 5/2017 | Perlo | B60L 53/80 |
| 10,017,037 B2* | 7/2018 | Newman | B60L 50/64 |
| 10,232,697 B2* | 3/2019 | Hara | B60L 50/66 |
| 10,300,948 B2* | 5/2019 | Ashraf | B62D 27/023 |
| 10,308,132 B2* | 6/2019 | Milton | B60L 1/00 |
| 10,632,857 B2* | 4/2020 | Matecki | B60K 1/04 |
| 10,800,457 B2* | 10/2020 | Shimizu | B62D 21/03 |
| 10,826,032 B2* | 11/2020 | Kaneshige | H01M 10/658 |
| 10,843,577 B2* | 11/2020 | Gunther | B60L 50/64 |
| 10,870,340 B2* | 12/2020 | Acikgoez | H01M 50/24 |
| 10,886,513 B2* | 1/2021 | Stephens | B60L 50/64 |
| 2006/0102398 A1* | 5/2006 | Mizuno | B60L 58/33 |
| | | | 429/430 |
| 2013/0206496 A1 | 8/2013 | Hashimoto | |
| 2017/0001507 A1 | 1/2017 | Ashraf et al. | |

\* cited by examiner

ововIgnoreCase

BODY-ON-FRAME ELECTRIC VEHICLE WITH BATTERY PACK INTEGRAL TO FRAME

FIELD

The present disclosure relates generally to body-on-frame electric vehicles and, more specifically, to body-on-frame electric vehicles with a battery pack integral to the vehicle's frame.

BACKGROUND

The statements in this section merely provide background information related to the present disclosure and may not constitute prior art.

Electric vehicles typically include a plurality of battery modules electrically coupled together to form a battery pack. The battery pack is typically pre-assembled on a battery support structure that is then mounted as one full battery assembly to the already fabricated vehicle frame. The connections between the battery assembly and the separate vehicle frame can provide pathways for noise, vibration, and harshness (NVH). Complete battery packs can also be very heavy, making assembly difficult and requiring thick, heavy frames and similarly robust mounts to secure the battery assembly to the frame. Furthermore, the mass of the separate battery assembly can add to sheer stresses in the frame.

These issues with typical electric vehicles are addressed by the present disclosure, which provides for a body-on-frame electric vehicle with a battery pack integral to the vehicle's frame.

SUMMARY

In one form, a body-on-frame vehicle includes a left frame rail, a right frame rail, a plate, a plurality of cross-members, a plurality of power storage modules, and a first electric motor. The plate is attached to both frame rails. The plurality of cross-members are attached to both frame rails. Adjacent cross-members cooperate with the plate and frame rails to define compartments. The plurality of power storage modules are disposed within a plurality of the compartments. The first electric motor is supported by a section of the frame rails forward or rearward of the power storage modules.

According to a further form, each cross-member is welded to the left frame rail, the right frame rail, and the plate. The plate is welded to the left and right frame rails.

According to a further form, the plate overlaps a bottom surface of the left frame rail and a bottom surface of the right frame rail.

According to a further form, the plurality of cross-members includes a first cross-member, a second cross-member, and a third cross-member. The plate, the first cross-member, and the second cross-member cooperate to define a first compartment of the compartments. The plate, the second cross-member, and the third cross-member cooperate to define a second compartment of the compartments. The second compartment is separated from the first compartment by the second cross-member. The plurality of power storage modules includes a set of first batteries or capacitors disposed within the first compartment and a set of second batteries or capacitors disposed within the second compartment.

According to a further form, the left and right frame rails extend longitudinally forward of a set of front wheels of the vehicle and rearward of a set of rear wheels of the vehicle. The first electric motor is configured to output rotational power to at least one of the set of front wheels and the set of rear wheels.

According to a further form, the vehicle further includes a front right suspension assembly, a front left suspension assembly, a rear right suspension assembly, and a rear left suspension assembly. The front right suspension assembly is mounted to a front section of the right frame rail. The front left suspension assembly mounted to a front section of the left frame rail. The rear right suspension assembly is mounted to a rear section of the right frame rail. The rear left suspension assembly is mounted to a rear section of the left frame rail.

According to a further form, the first electric motor is coupled to the left and right frame rails and supported between the left and right frame rails. The first electric motor is electrically coupled to the plurality of power storage modules to receive electric power from the power storage modules.

According to a further form, the vehicle further includes a second electric motor. The second electric motor is coupled to the left and right frame rails and supported between the left and right frame rails. The first electric motor is forward of the plurality of power storage modules and the second electric motor is rearward of the plurality of power storage modules. The second electric motor is electrically coupled to the plurality of power storage modules to receive electric power from the power storage modules.

According to a further form, the left and right rails each have a forward section, a rearward section, and a center section. The forward sections are disposed between a set of front wheels. The rearward sections are disposed between a set of rear wheels. The center section is disposed rearward of the set of front wheels and forward of the set of rear wheels. The center sections are formed of roll formed steel or extruded aluminum.

According to a further form, the center section of the left rail is parallel to the center section of the right rail. A number of the cross-members is based on a length the center sections. The cross-members are fixedly coupled to the center sections.

According to a further form, the plurality of power storage modules include a plurality of batteries or a plurality of capacitors.

According to a further form, the vehicle further includes a vehicle body mounted to the left and right frame rails.

In another form, a body-on-frame vehicle includes a left rail a right rail, a plate, a plurality of cross-members, a plurality of batteries, and a first electric motor. The plate is welded to a bottom of both rails. The plurality of cross-members are welded to the plate and center sections of both rails. Adjacent cross-members cooperate with the plate and both rails to define compartments. The plurality of batteries within a plurality of the compartments. The first electric motor is supported by a forward or rearward section of the rails and powered by the batteries.

According to a further form, the plate overlaps a bottom surface of the left rail and a bottom surface of the right rail.

According to a further form, the left and right rails each have a forward end that is longitudinally forward of a set of front wheels of the vehicle and a rearward end that is rearward of a set of rear wheels of the vehicle.

According to a further form, the vehicle further includes a second electric motor. The first electric motor being coupled to the left and right rails and supported between the left and right rails forward of the plurality of batteries. The second electric motor being coupled to the left and right rails and supported between the left and right rails rearward of the plurality of batteries. The second electric motor being powered by the batteries.

According to a further form, the center sections of the left and right rails are disposed between a set of front wheels of the vehicle and a set of rear wheels of the vehicle. The center sections are formed of roll formed steel or extruded aluminum. The center section of the left rail is parallel to the center section of the right rail. A number of the cross-members is based on a length the center sections. The cross-members are fixedly coupled to the center sections.

According to a further form, the vehicle further includes a vehicle body mounted to the left and right rails.

In another form, a method of manufacturing a body-on-frame vehicle includes providing a left rail and a right rail spaced laterally apart. The method includes welding cross-members to both rails. The method includes welding a plate to a bottom of both rails. The method includes inserting, from above the rails, power storage units into a plurality of compartments defined by the plate, the cross-members, and both rails. The method includes mounting a first electric drive motor between the rails forward or rearward of the power storage units.

According to a further form, the method further includes welding the plate to the cross-members.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
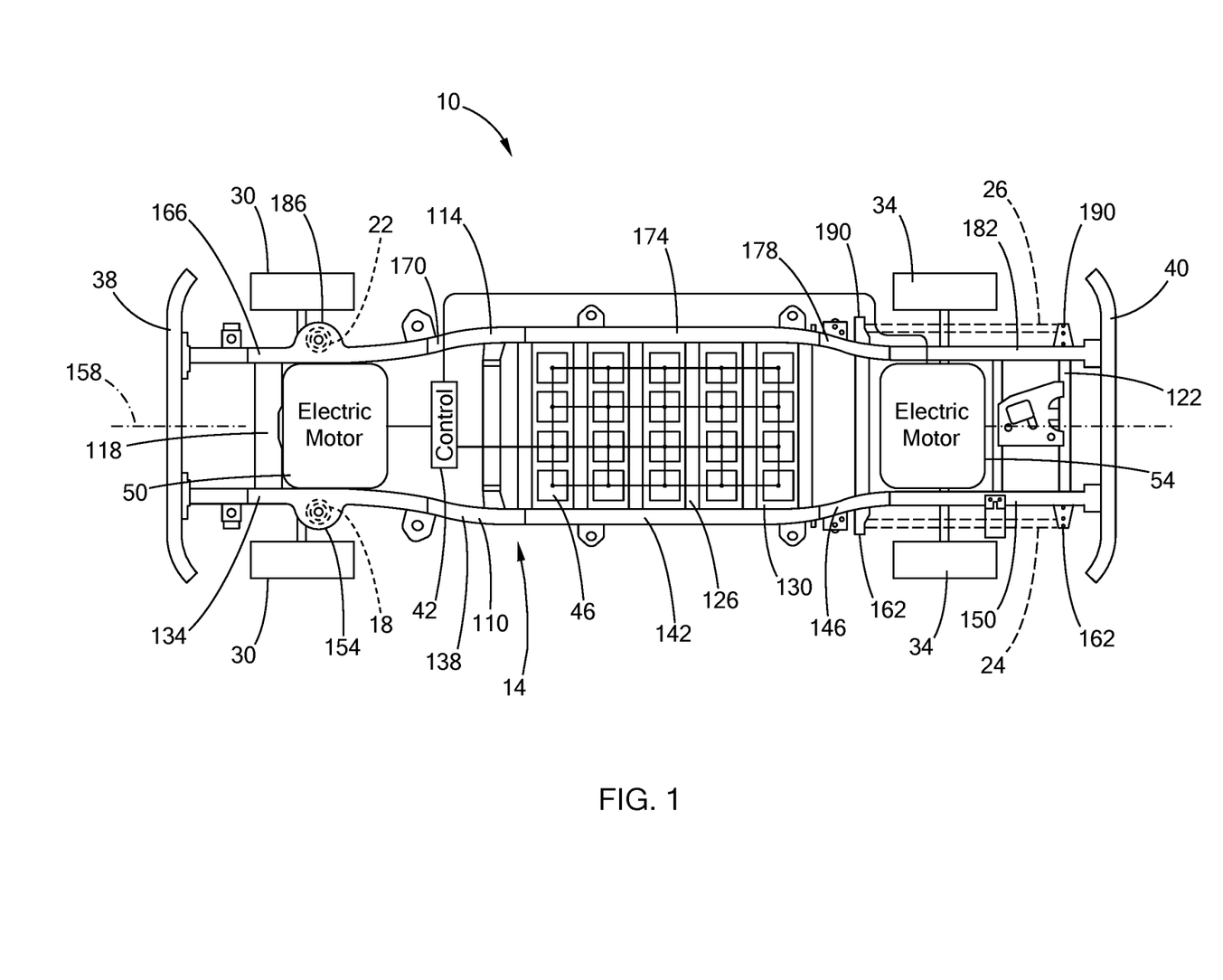
FIG. 1 is a top down view of a portion of a vehicle in accordance with the teachings of the present disclosure.

With reference to FIG. 1, a portion of a body-on-frame electric vehicle 10 is illustrated. The vehicle 10 can be any suitable type of body-on-frame vehicle (e.g., a truck, sport utility vehicle, passenger car) that has a body mounted to a frame that is distinct from the body. The vehicle 10 includes a frame 14, a front left suspension 18, a front right suspension 22, a rear left suspension 24, a rear right suspension 26, a pair of front wheels 30, a pair of rear wheels 34, a front bumper member 38, a rear bumper member 40, at least one electric drive motor, a control module 42, and a plurality of power storage units 46. In the example provided, the vehicle 10 includes a first drive motor 50 and a second drive motor 54, though other configurations can be used.

Figure 4:
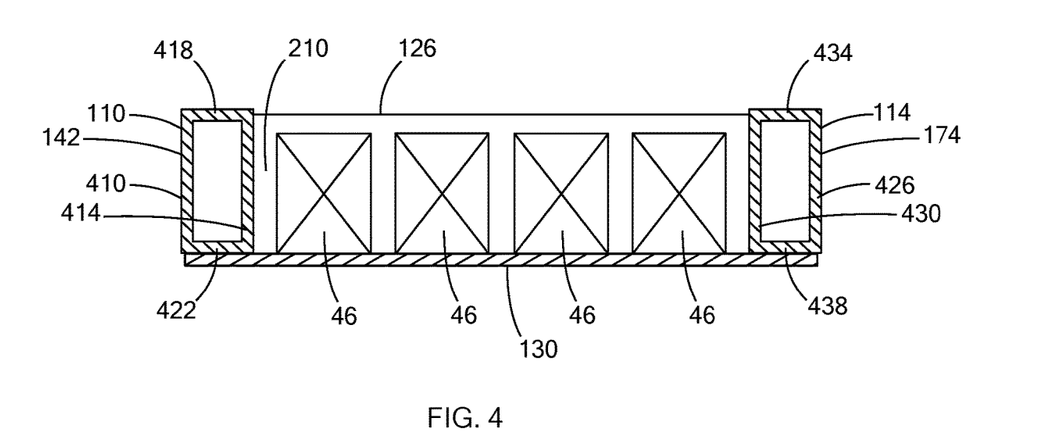
FIG. 4 is a cross-sectional view of the center portion of the vehicle frame of FIG. 2, taken along line 4-4 shown in FIG. 2.

The frame 14 includes a left frame rail 110, a right frame rail 114, a plurality of front cross-members 118, a plurality of rear cross-members 122, a plurality of center cross-members 126, and a bottom plate 130. The left frame rail 110 includes a left front rail portion 134, a left front transition portion 138, a left center rail portion 142, a left rear transition portion 146, and a left rear rail portion 150. As best shown in FIG. 4, the left frame rail 110 is a generally rectangular tube structure with an outboard wall 410, an inboard wall 414, a top wall 418, and a bottom wall 422 that cooperate to form the hollow tube shaped cross-section of the left frame rail 110. In the example provided, the left frame rail 110 is formed by cold rolling steel or by extruding aluminum into the hollow tube shape, though other methods of forming the tubular shape can be used.

In the example provided, the left front rail portion 134 extends from the front end of the vehicle 10 rearward to a location just rear of the front wheels 30. The left front rail portion 134 includes a front left suspension mount 154. The front left suspension 18 is mounted to the front left suspension mount 154 and configured to support the left frame rail relative to the left front wheel 30. In the example provided, the front left suspension 18 includes a strut (not specifically shown) with a damper and spring, though other configurations can be used. In the example provided, the left front rail portion 134 is generally parallel to a longitudinal axis 158 of the vehicle 10 that separates the left side of the vehicle 10 from the right side.

The left front transition portion 138 extends from a rearward end of the left front rail portion 134 generally at an angle rearward and laterally outboard from the left front rail portion 134 to the forward end of the left center rail portion 142. The left center rail portion 142 is parallel to the longitudinal axis 158 of the vehicle 10 and is laterally outboard of the left front rail portion 134.

The left rear transition portion 146 extends from a rearward end of the left center rail portion 142 generally at an angle rearward and laterally inboard from the left center rail portion 142 to the forward end of the left rear rail portion 150. In the example provided, the left rear rail portion 150 is parallel to the longitudinal axis 158 of the vehicle 10 and is laterally inboard of the left center rail portion 142. The left rear rail portion 150 extends longitudinally rearward of the rear wheels 34. The left rear rail portion 150 includes rear left suspension mounts 162. The rear left suspension 24 is mounted to the rear left suspension mounts 162 and configured to support the left frame rail 110 relative to the left rear wheel 34. In the example provided, the rear left suspension 24 includes a plurality of leaf springs (not specifically shown) and a damper (not shown), though other configurations can be used.

The right frame rail 114 is generally a mirror image of the left frame rail 110 and is spaced apart an equal distance from the longitudinal axis 158 as the left frame rail 110. The right frame rail 114 includes a right front rail portion 166, a right front transition portion 170, a right center rail portion 174, a right rear transition portion 178, and a right rear rail portion 182. As best shown in FIG. 4, the right frame rail 114 is a generally rectangular tube structure with an outboard wall 426, an inboard wall 430, a top wall 434, and a bottom wall 438 that cooperate to form the hollow tube shaped cross-section of the right frame rail 114. In the example provided, the right frame rail 114 is formed by cold rolling steel or by extruding aluminum into the hollow tube shape, though other methods of forming the tubular shape can be used.

In the example provided, the right front rail portion 166 extends from the front end of the vehicle 10 rearward to a location just rear of the front wheels 30. The right front rail portion 166 includes a front right suspension mount 186. The front right suspension 22 is mounted to the front right suspension mount 186 and configured to support the right frame rail relative to the right front wheel 30. In the example provided, the front right suspension 22 includes a strut (not specifically shown) with a damper and spring, though other configurations can be used. In the example provided, the right front rail portion 166 is generally parallel to the longitudinal axis 158 of the vehicle 10. The front bumper member 38 is mounted to and spans between the forward tip of the left front rail portion 134 and the forward tip of the right front rail portion 166.

The right front transition portion 170 extends from a rearward end of the right front rail portion 166 generally at an angle rearward and laterally outboard from the right front rail portion 166 to the forward end of the right center rail portion 174. The right center rail portion 174 is parallel to the longitudinal axis 158 of the vehicle 10 and is laterally outboard of the right front rail portion 166.

The right rear transition portion 178 extends from a rearward end of the right center rail portion 174 generally at an angle rearward and laterally inboard from the right center rail portion 174 to the forward end of the right rear rail portion 182. In the example provided, the right rear rail portion 182 is parallel to the longitudinal axis 158 of the vehicle 10 and is laterally inboard of the right center rail portion 174. The right rear rail portion 182 extends longitudinally rearward of the rear wheels 34. The right rear rail portion 182 includes rear right suspension mounts 190. The rear right suspension 26 is mounted to the rear right suspension mounts 190 and configured to support the right frame rail 114 relative to the right rear wheel 34. In the example provided, the rear right suspension 26 includes a plurality of leaf springs (not specifically shown) and a damper (not shown), though other configurations can be used. The rear bumper member 40 is mounted to and spans between the rearward tip of the left rear rail portion 150 and the rearward tip of the right rear rail portion 182.

The front cross-members 118 span laterally between the left and right front rail portions 134, 166 and/or laterally between the left and right front transition portions 138, 170. Each front cross-member 118 has a left end attached to the left frame rail 110 and a right end attached to the right frame rail 114. In the example provided, the front cross-members 118 are generally perpendicular to the axis 158. In the example provided, the left end of a first one of the front cross-members 118 is welded directly to the left front rail portion 134 and the right end is welded directly to the right front rail portion 166. In the example provided, another one of the front cross-members 118 has one end welded directly to the left front transition portion 138 and the other end welded directly to the right front transition portion 170. In an alternative configuration, not specifically shown, the front cross-members 118 can be bolted to the frame rails 110, 114.

In the example provided, the rear cross-members 122 span laterally between the left and right rear rail portions 150, 182 and/or the left and right rear transition portions 146, 178. Each rear cross-member 122 has a left end attached to the left frame rail 110 and a right end attached to the right frame rail 114. In the example provided, the rear cross-members 122 are generally perpendicular to the axis 158. In the example provided, the left end of a first one of the rear cross-members 122 is welded directly to the left rear transition portion 146 and the right end is welded directly to the right rear transition portion 178. In the example provided, a pair of other ones of the rear cross-members 122 each have one end welded directly to the left rear rail portion 150 and the other end welded directly to the right rear rail portion 182. In an alternative configuration, not specifically shown, the rear cross-members 122 can be bolted to the frame rails 110, 114.

Figure 2:
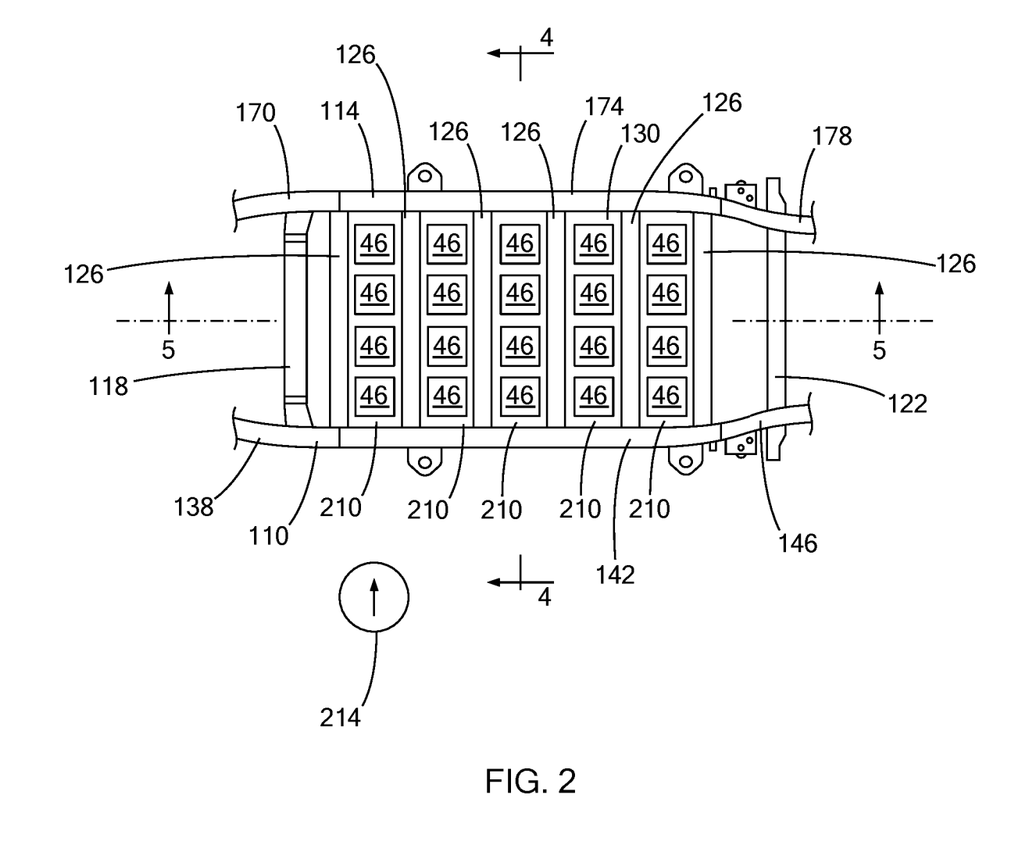
FIG. 2 is a top down view of a center portion of a vehicle frame of the vehicle of FIG. 1.

With additional reference to FIG. 2, the center cross-members 126 span laterally between the left and right center rail portions 142, 174. Each center cross-member 126 has a left end attached to the left frame rail 110 and a right end attached to the right frame rail 114. In the example provided, the center cross-members 126 are generally perpendicular to the axis 158 and are equally spaced apart in the longitudinal direction of the vehicle 10. In the example provided, the vehicle 10 includes six center cross-members 126, though other numbers of center cross-members 126 can be used. The quantity and spacing of the center cross-members 126 is based on the length of the left and right center rail portions 142, 174 and the size and quantity of the power storage units 46. In the example provided, the left end of each center cross-member 126 is welded directly to the inboard wall 414 of the left center rail portion 142 while the right end of each center cross-member 126 is welded directly to the inboard wall 430 of the right center rail portion 174. In an alternative configuration, not specifically shown, the center cross-members 126 can be bolted to the frame rails 110, 114.

Figure 5:
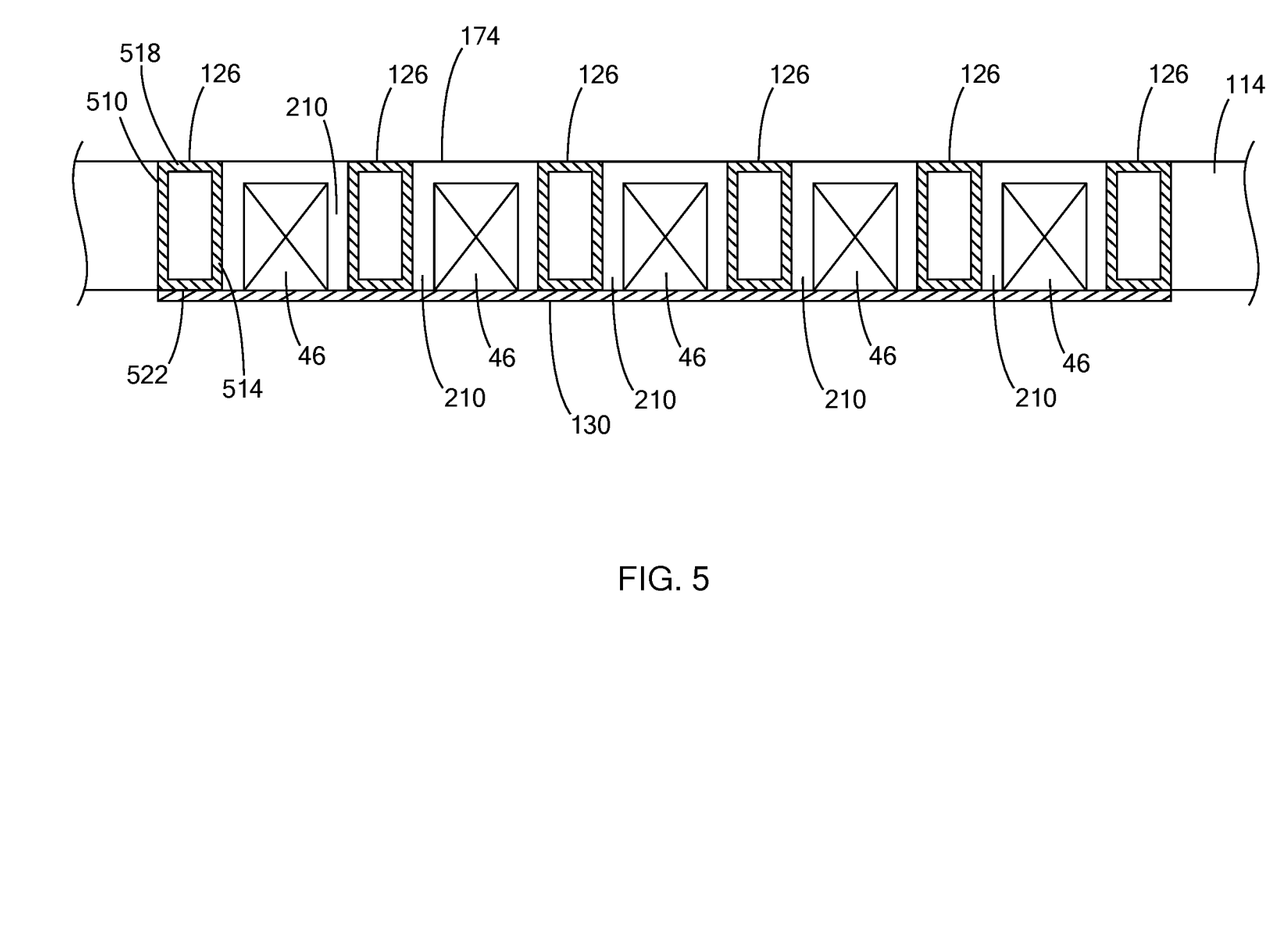
FIG. 5 is a cross-sectional view of the center portion of the vehicle frame of FIG. 2, taken along line 5-5 shown in FIG. 2.

As best shown in FIG. 5, each center cross-member 126 is a generally rectangular tube structure with a forward wall 510, a rearward wall 514, a top wall 518, and a bottom wall 522 that cooperate to form the hollow tube shaped cross-section of the center cross-member 126. In the example provided, the bottom surfaces of the bottom walls 522 of the center cross-members 126 are aligned along a common bottom plane that is also aligned with the bottom surfaces of the bottom walls 422, 438 of the left and right frame rails 110, 114. In the example provided, the top surfaces of the top walls 518 of the center cross-members 126 are aligned along a top plane that is also aligned with the top surfaces of the top walls 418, 434 of the left and right frame rails 110, 114, though other configurations can be used. In the example provided, the center cross-members 126 all have similar heights. In an alternative configuration, not specifically shown, the bottom surface of the bottom walls 522 of the center cross-members 126 are aligned, but some of the center cross-members 126 can have different heights. In the example provided, the center cross-members 126 all have similar widths in the longitudinal direction (i.e., the distance between the forward wall 510 and the rearward wall 514 of each center cross-member 126). In an alternative configuration, not specifically shown, some of the center cross-members 126 can have different longitudinal widths.

Figure 3:
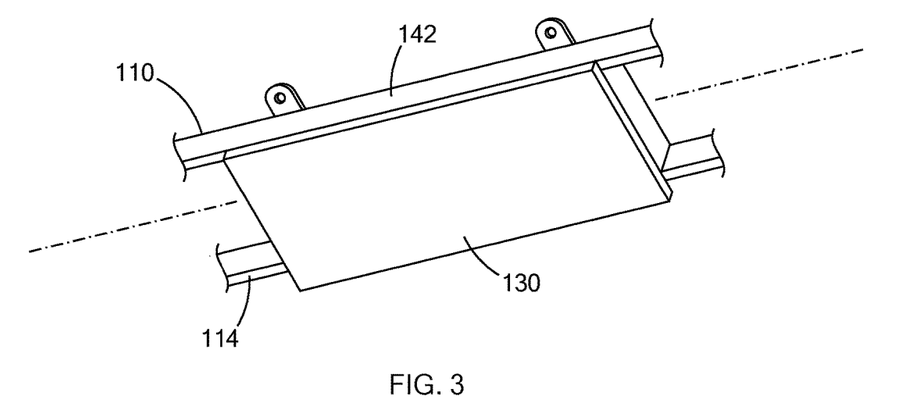
FIG. 3 is a bottom perspective view of the center portion of the vehicle frame of FIG. 2.

With continued reference to FIGS. 2, 4, and 5, and additional reference to FIG. 3, the bottom plate 130, also referred to as a shear plate, is a metal plate having a generally flat, rectangular shape. The bottom plate 130 is attached to the left center rail portion 142 and the right center rail portion 174. In the example provided, the bottom plate 130 has a width in the lateral direction such that it spans between the left center rail portion 142 and the right center rail portion 174 and overlaps the bottom surfaces of the bottom walls 422, 438 of the left and right center rail portions 142, 174. In the example provided, a top surface of the bottom plate 130 opposes and contacts the bottom surfaces of the left and right center rail portions 142, 174 and overlaps substantially the entire bottom surfaces of the bottom walls 422, 438. In the example provided, the bottom plate 130 is welded directly to the left and right center rail portions 142, 174. In an alternative configuration, not specifically shown, the bottom plate 130 can be bolted to the frame rails 110, 114.

In the example provided, the bottom plate 130 has a length in the longitudinal direction that spans between the forward most one of the center cross-members 126 and the rearward most one of the center cross-members 126. The bottom plate 130 is also attached to each of the center cross-members 126. In the example provided, the top surface of the bottom plate 130 opposes and contacts the bottom surfaces of the center cross-members 126. In the example provided, the bottom plate 130 is welded directly to each of the center cross-members 126. In an alternative configuration, not specifically shown, the bottom plate 130 can be bolted to the center cross-members 126.

In the example provided, the bottom plate 130 cooperates with the left frame rail 110, the right frame rail 114, and the center cross-members 126 to define a plurality of compartments 210 between adjacent ones of the center cross-members 126. The bottom plate 130 defines the bottom of each compartment 210. The inboard wall 414 of the left frame rail 110 defines the left side of the compartments 210. The inboard wall 430 of the right frame rail 114 defines the right side of the compartments 210. The rearward wall 514 of each center cross-member 126 (except the rearward most center cross-member 126) defines the forward side of a corresponding compartment 210. The forward wall 510 of each center cross-member 126 (except the forward most center cross-member 126) defines the rearward side of a corresponding compartment 210. A top side of each compartment 210 is open. Thus, adjacent compartments 210 are generally separated from each other by one of the center cross-members 126.

Returning to FIG. 1, the first and second drive motors 50, 54 are mounted to and supported by the frame 14. The first drive motor 50 is drivingly coupled to the front wheels 30 to provide rotary power to the front wheels 30 and can be connected to the front wheels 30 through a differential (not shown) or other gearsets (not shown). In an alternative configuration, not specifically shown, one drive motor can drive the left front wheel 30 while another drive motor can drive the right front wheel 30. In the example provided, the second drive motor 54 is drivingly coupled to the rear wheels 34 to provide rotary power to the rear wheels 34 and can be connected to the rear wheels 34 through a differential (not shown) or other gearsets (not shown). In an alternative configuration, not specifically shown, one drive motor can drive the left rear wheel 34 while another drive motor can drive the right rear wheel 34.

In the example provided, the first drive motor 50 is mounted between the left and right front rail portions 134, 166, i.e., forward of the power storage units 46, while the second drive motor 54 is mounted between the left and right rear rail portions 150, 182, i.e., rearward of the power storage units 46. The first drive motor 50 is mounted to the left and right front rail portions 134, 166 and/or to one or more of the front cross-members 118. The second drive motor 54 is mounted to the left and right rear rail portions 150, 182 and/or to one or more of the rear cross-members 122.

The control module 42 is supported within the vehicle 10, such as being mounted to the frame 14 or the body (not specifically shown), and electrically coupled to the first drive motor 50, the second drive motor 54, and the power storage units 46. The control module 42 is configured to control operation of the first drive motor 50 and the second drive motor 54, such as by controlling the flow of electrical power between the power storage units 46 and the first and second drive motors 50, 54. For example, the control module 42 is configured to provide electrical power from the power storage units 46 to the first and/or second drive motor 50, 54 when propulsive power is desired, or to permit the first and/or second drive motor 50, 54 to act as a generator during regenerative braking to charge the power storage units 46. The control module 42 can operate the first and second drive motors 50, 54 and the power storage units 46 based on input provided by a user (not shown) and/or predetermined conditions.

The power storage units 46 can be any suitable type of electrical power storage unit, such as batteries or capacitors. The power storage units 46 are electrically coupled together to form a power pack. In the example provided, the power storage units 46 are batteries coupled together by wires to form a battery pack. In an alternative configuration, the power storage units are capacitors electrically coupled together by wires to form a super-capacitor pack. Thus, the power pack is spread between physically separate compartments 210 of the vehicle frame 14.

The power storage units 46 are received in the compartments 210 and mounted to the bottom plate 130 and/or mounted to the center cross-members 126 that define the corresponding compartment 210 in which they reside. Each compartment 210 houses a distinct set of power storage units. In the example provided, each compartment 210 houses four of the power storage units 46, though other configurations can be used based on the size and shape of the power storage units 46. For example, the four power storage units 46 in each compartment 210 could be replaced with one long and narrow power storage unit 46 spanning laterally between the left and right frame rails 110, 114, or any number of power storage units 46 arranged in the compartment 210. In the example provided, each power storage unit 46 has a height such that the top of each power storage unit is recessed below the top surfaces of the left and right frame rails 110, 114 and the center cross-members 126. Thus, the power storage units 46 are nested in and protected within the compartments 210.

Thus, the bottom plate 130 and center cross-members 126 are integral to the vehicle frame 14, providing additional structural stiffness to the vehicle frame 14, while also defining the individual compartments 210 in which the power storage units 46 are housed. The bottom plate 130 provides shear strength to the frame 14 while also forming the bottom of the frame and directly supporting the power storage units 46. The added shear strength and structural stiffness provided by the bottom plate 130 and center cross-members 126 can also permit the gage or wall thickness of the left and right frame rails 110, 114 to be reduced from that of a typical body-on-frame vehicle. The structural stiffness added by the bottom plate 130 and center cross-members 126 also provide reduced noise, vibration, and harshness (NVH). The bottom plate 130 and center cross-members 126 also provide structural protection to the power storage units

46 during impact events such as when a solid pylon 214 (shown in FIG. 2) impacts the side of the vehicle 10.

Figure 6:
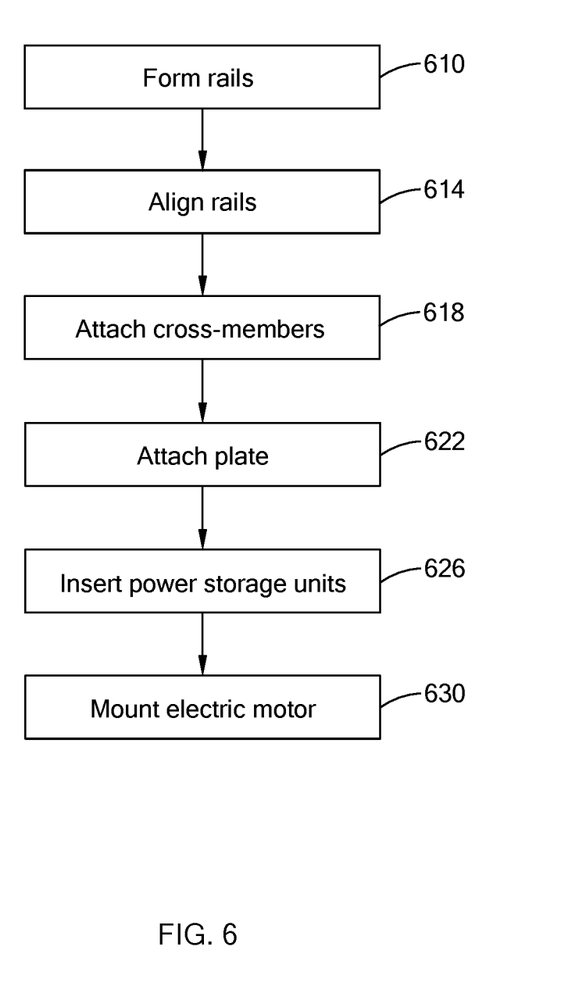
FIG. 6 is a flow chart of a method of assembling the vehicle of FIG.

With additional reference to FIG. 6, a method of manufacturing the vehicle 10 is illustrated in flow chart form. At step 610, the left and right frame rails 110, 114, the front cross-members 118, the center cross-members 126, and the rear cross-members 122 can be formed. The forming process can include extruding aluminum or cold-rolling steel for example.

At step 614, the left and right frame rails 110, 114 are aligned parallel to each other on opposite sides of the axis 158. At step 618, the cross-members 118, 122, 126 are attached (e.g., welded or bolted) to the left and right frame rails 110, 114. At step 622, the bottom plate 130 is attached (e.g., welded or bolted) to the bottom of the center cross-members 126 and the frame rails 110, 114 to form the compartments 210.

At step 626, the power storage units 46 are lowered down from above the frame rails 110, 114 to be inserted into each compartment 210. The power storage units are mounted to the bottom plate 130, the center cross-members 126, and/or the frame rails 110, 114 and are electrically connected together to form the power pack.

At step 630, the first drive motor 50 is mounted to the frame 14. The control module 42 and the second drive motor 54 can also be mounted to the frame 14. The first and second drive motors 50, 54 are then electrically coupled to the control module 42 and the power storage units 46.

Since the left and right center rail portions 142, 174 are generally parallel to each other in the assembled vehicle 10, the total length of the left and right center rail portions 142, 174 can be formed in step 610 based on the desired length of the vehicle 10. The quantity of center cross-members 126 can also vary depending on the desired length of the vehicle 10. The length of the left and right center rail portions 142, 174 can also determine the quantity of power storage units 46 that can fit in the vehicle 10. Thus, the configuration of the parallel left and right center rail portions 142, 174 and center cross-members 126 provides a modularity of the frame 14 such that different size vehicles with different battery capacity (e.g., range) can be produced without re-designing or changing the vehicle architecture of the rest of the frame 14. Similarly, the vehicle's lateral wheel base and battery capacity can be changed by changing the length of the cross-members 118, 122, 126 at step 610, without changing the rest of the frame's architecture. Thus, many different sizes and types of vehicles can be manufactured with the same tooling and process.

Additionally, the integral nature of the bottom plate 130 and the center cross-members 126 in the frame improve structural strength of the frame 14 and can permit the wall thicknesses of the left and right center rail portions 142, 174 of the frame rails 110, 114 to be thinner, thus reducing weight and cost of the frame 14 over traditional electric vehicle frames (not shown). The integral nature also reduces the pathways for noise, vibration and harshness (NVH) when compared to traditional electric vehicle frames (not shown).

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A body-on-frame vehicle comprising:
   a left frame rail having a plurality of side walls that cooperate to define a unitary left structure that extends longitudinally with respect to a longitudinal axis of the vehicle;
   a right frame rail having a plurality of side walls that cooperate to define a unitary right structure that extends longitudinally with respect to the longitudinal axis of the vehicle;
   a plate attached directly to the unitary left structure and the unitary right structure;
   a plurality of cross-members attached directly to the unitary left structure and the unitary right structure, adjacent cross-members cooperating with the plate, the unitary left structure, and the unitary right structure to define compartments;
   a plurality of power storage modules disposed within a plurality of the compartments; and
   a first electric motor supported by a section of the unitary left and right structures forward or rearward of the power storage modules.

2. The vehicle of claim 1, wherein each cross-member is welded to the left frame rail, the right frame rail, and the plate and the plate is welded to the left and right frame rails.

3. The vehicle of claim 2, wherein the plate overlaps a bottom surface of the left frame rail and a bottom surface of the right frame rail.

4. The vehicle of claim 1, wherein the plurality of cross-members includes a first cross-member, a second cross-member, and a third cross-member, wherein the plate, the first cross-member, and the second cross-member cooperate to define a first compartment of the compartments, wherein the plate, the second cross-member, and the third cross-member cooperate to define a second compartment of the compartments that is separated from the first compartment by the second cross-member, wherein the plurality of power storage modules includes a set of first batteries or capacitors disposed within the first compartment and a set of second batteries or capacitors disposed within the second compartment.

5. The vehicle of claim 1, wherein the left and right frame rails extend longitudinally forward of a set of front wheels of the vehicle and rearward of a set of rear wheels of the vehicle, the first electric motor being configured to output rotational power to at least one of the set of front wheels and the set of rear wheels.

6. The vehicle of claim 5, further comprising a front right suspension assembly, a front left suspension assembly, a rear right suspension assembly, and a rear left suspension assembly, the front right suspension assembly mounted to a front section of the right frame rail, the front left suspension assembly mounted to a front section of the left frame rail, the rear right suspension assembly mounted to a rear section of the right frame rail, and the rear left suspension assembly mounted to a rear section of the left frame rail.

7. The vehicle of claim 1, wherein the first electric motor is coupled to the left and right frame rails and supported between the left and right frame rails, the first electric motor being electrically coupled to the plurality of power storage modules to receive electric power from the power storage modules.

8. The vehicle of claim 7, further comprising a second electric motor, the second electric motor coupled to the left and right frame rails and supported between the left and right frame rails, wherein the first electric motor is forward of the plurality of power storage modules and the second electric motor is rearward of the plurality of power storage modules, the second electric motor being electrically coupled to the plurality of power storage modules to receive electric power from the power storage modules.

9. The vehicle of claim 1, wherein the left and right frame rails each have a forward section, a rearward section, and a center section, the forward sections being disposed between a set of front wheels, the rearward sections being disposed between a set of rear wheels, the center section being disposed rearward of the set of front wheels and forward of the set of rear wheels, the center sections being formed of roll formed steel or extruded aluminum.

10. The vehicle of claim 9, wherein the center section of the left frame rail is parallel to the center section of the right frame rail and a number of the cross-members is based on a length of the center sections, wherein the cross-members are fixedly coupled to the center sections.

11. The vehicle of claim 1, wherein the plurality of power storage modules include a plurality of batteries or a plurality of capacitors.

12. The vehicle of claim 1, wherein the left and right frame rails are for supporting a vehicle body mounted to the left and right frame rails.

13. A body-on-frame vehicle comprising:
   a left frame rail having a plurality of side walls that cooperate to define a unitary left structure that extends longitudinally with respect to a longitudinal axis of the vehicle;
   a right frame rail having a plurality of side walls that cooperate to define a unitary right structure that extends longitudinally with respect to the longitudinal axis of the vehicle;
   a plate welded to a bottom of the unitary left structure and a bottom of the unitary right structure;
   a plurality of cross-members welded to the plate and center sections of both the unitary left structure and the unitary right structure, adjacent cross-members cooperating with the plate, the unitary left structure, and the unitary right structure to define compartments;
   a plurality of batteries within a plurality of the compartments; and
   a first electric motor supported by a forward or rearward section of the unitary left and right structures and powered by the batteries.

14. The vehicle of claim 13, wherein the plate overlaps a bottom surface of the unitary left structure and a bottom surface of the unitary right structure.

15. The vehicle of claim 13, wherein the unitary left and right structures each have a forward end that is longitudinally forward of a set of front wheels of the vehicle and a rearward end that is rearward of a set of rear wheels of the vehicle.

16. The vehicle of claim 13, further comprising a second electric motor, the first electric motor being coupled to the left and right frame rails and supported between the left and right frame rails forward of the plurality of batteries, the second electric motor being coupled to the left and right frame rails and supported between the left and right frame rails rearward of the plurality of batteries, the second electric motor being powered by the batteries.

17. The vehicle of claim 13, wherein the center sections of the left and right frame rails are disposed between a set of front wheels of the vehicle and a set of rear wheels of the vehicle, the center sections being formed of roll formed steel or extruded aluminum, wherein the center section of the left frame rail is parallel to the center section of the right frame rail and a number of the cross-members is based on a length of the center sections, wherein the cross-members are fixedly coupled to the center sections.

18. The vehicle of claim 13, wherein the left and right frame rails are for supporting a vehicle body mounted to the left and right frame rails.

19. A method of manufacturing a body-on-frame vehicle comprising:
 providing a left frame rail and a right frame rail spaced laterally apart, wherein the left frame rail includes a plurality of side walls that cooperate to define a unitary left structure that extends longitudinally with respect to a longitudinal axis of the vehicle and the right frame rail includes a plurality of side walls that cooperate to define a unitary right structure;
 welding cross-members to the unitary left structure and the unitary right structure;
 welding a plate to a bottom of the unitary left structure and a bottom of the unitary right structure;
 inserting, from above the rails, a plurality of power storage units into a plurality of compartments defined by the plate, cross-members, the unitary left structure and the unitary right structure; and
 mounting a first electric drive motor between the unitary left structure and the unitary right structure forward or rearward of the power storage units.

20. The method of claim 19, further comprising welding the plate to the cross-members.

* * * * *